United States Patent
Carey

(10) Patent No.: US 9,773,163 B2
(45) Date of Patent: Sep. 26, 2017

(54) ENTERTAINMENT DEVICE SAFETY SYSTEM AND RELATED METHODS OF USE

(71) Applicant: Click-it, Inc., Bethpage, NY (US)

(72) Inventor: James Carey, Commack, NY (US)

( * ) Notice: Subject to any disclaimer, the term of this patent is extended or adjusted under 35 U.S.C. 154(b) by 135 days.

(21) Appl. No.: 14/542,013

(22) Filed: Nov. 14, 2014

(65) Prior Publication Data

US 2015/0130934 A1    May 14, 2015

Related U.S. Application Data

(60) Provisional application No. 61/904,201, filed on Nov. 14, 2013.

(51) Int. Cl.
*G06K 9/00* (2006.01)
*H04N 7/18* (2006.01)

(52) U.S. Cl.
CPC ......... *G06K 9/00362* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 6,975,346 B2 * | 12/2005 | Kumhyr | G06K 9/00288 348/143 |
| 7,382,244 B1 * | 6/2008 | Donovan | G08B 13/19645 340/506 |
| 8,634,980 B1 | 1/2014 | Urmson et al. | |
| 8,711,217 B2 * | 4/2014 | Venetianer | G06F 17/3079 348/143 |
| 2004/0161133 A1 * | 8/2004 | Elazar | G01S 3/7864 382/115 |
| 2007/0182534 A1 | 8/2007 | Gregory | |
| 2007/0182818 A1 * | 8/2007 | Buehler | G08B 13/19602 348/143 |
| 2008/0198231 A1 * | 8/2008 | Ozdemir | G08B 13/19608 348/159 |
| 2009/0222388 A1 | 9/2009 | Hua et al. | |

(Continued)

FOREIGN PATENT DOCUMENTS

WO    2006024298 A1    3/2006

OTHER PUBLICATIONS

Daniel A. Vaquero et al., "Attribute-Based People Search," Chapter 14, Intellegent Video Surveillance: Systems and Technology, published Dec. 7, 2009, pp. 387-405.

*Primary Examiner* — Reza Aghevli
(74) *Attorney, Agent, or Firm* — Carter, Deluca, Farrell & Schmidt, LLP

(57) ABSTRACT

An entertainment device safety system includes a video camera configured to capture video of an entertainment device and a user of the entertainment device and a video analytic module to perform real-time video processing of the captured video to generate non-video data from video. A computer receives the video and the non-video data from the video camera analyzes the video or the non-video data to determine a user position in relation to the entertainment device. The user position is compared to a user position rule to determine whether the user position violates the user position rule. A notification is transmitted in response to a determination that the user position violates the user position rule.

13 Claims, 1 Drawing Sheet

(56) References Cited

U.S. PATENT DOCUMENTS

| | | | | |
|---|---|---|---|---|
| 2010/0020172 A1* | 1/2010 | Mariadoss | ....... | G08B 13/19613 348/143 |
| 2010/0321183 A1* | 12/2010 | Donovan | ......... | G08B 13/19645 340/540 |
| 2011/0050896 A1* | 3/2011 | Cobb | ................ | G06K 9/00771 348/143 |
| 2011/0211070 A1* | 9/2011 | Shu | .................... | G06F 17/3079 348/143 |
| 2012/0327241 A1 | 12/2012 | Howe | | |
| 2013/0271598 A1* | 10/2013 | Mariadoss | ....... | G08B 13/19613 348/143 |

* cited by examiner

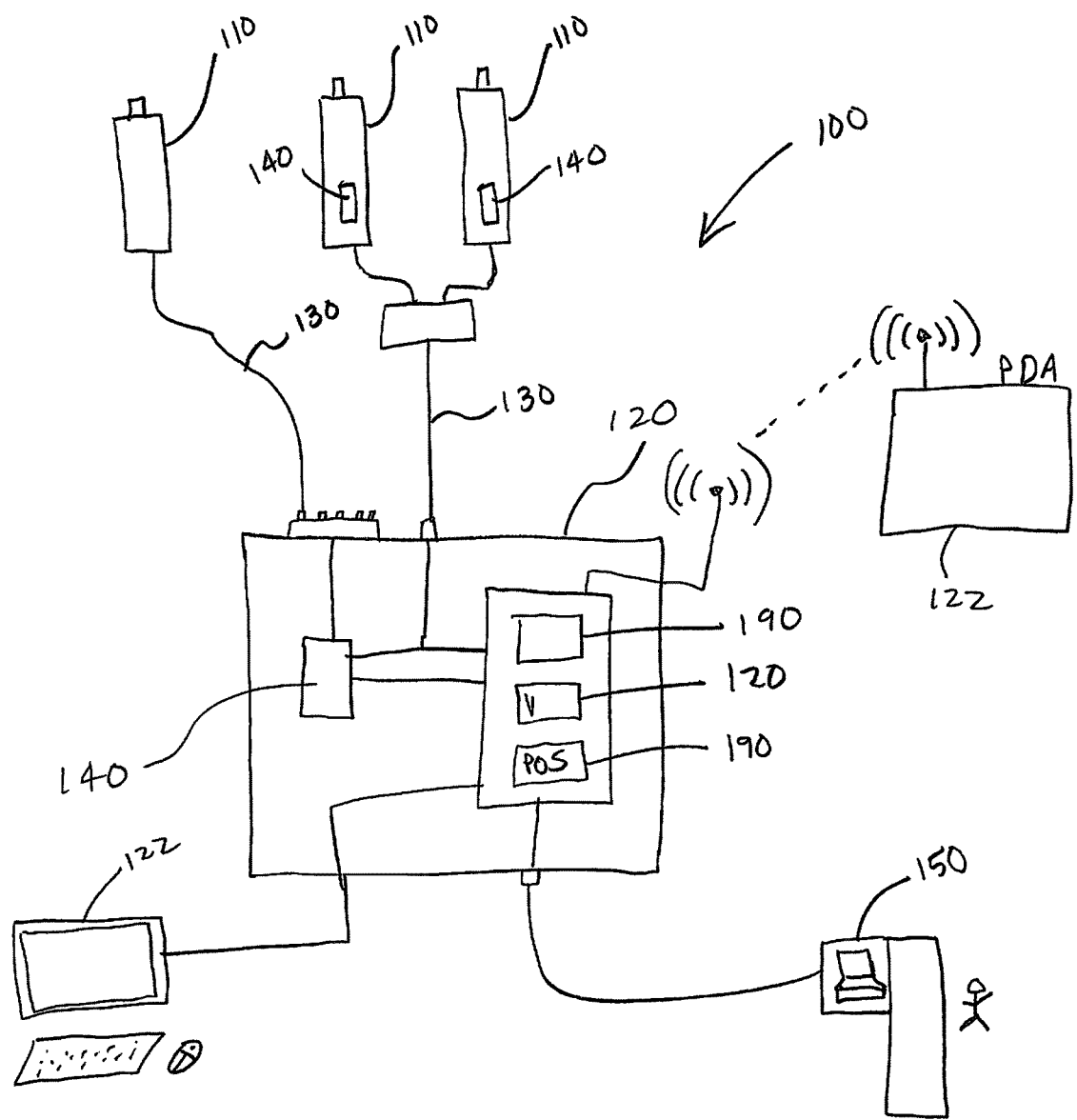

ENTERTAINMENT DEVICE SAFETY SYSTEM AND RELATED METHODS OF USE

CROSS REFERENCE TO RELATED APPLICATIONS

The present application claims priority to, and the benefit of, U.S. Provisional Application Ser. No. 61/904,201, filed on Nov. 14, 2013, the disclosure of which is herein incorporated by reference in its entirety.

BACKGROUND

1. Technical Field

The present disclosure relates to video observation systems and methods of use, and in particular, to a real-time video safety system for detecting unsafe conditions, non-conformities, and/or violations of amusement park safety rules.

2. Background of Related Art

Companies are continually trying to identify specific user behavior in order to improve throughput, efficiency and, in some instances, minimize the safety risk to its consumers or in the service industry, the users. One particular industry that places a high regard on consumer or user safety is the entertainment industry, and, in particular, amusement or theme parks which provide rides or include user participation of some sort.

Amusement parks are typically required to provide some measure of user safety in the form of mechanical or electromechanical latches, pins, harnesses, gates, belts, and the like which are typically manually operated by the user, or automatically engaged after the user is properly positioned on the ride. In some instances, a ride attendant is responsible for checking or verifying that the safety feature is properly engaged before the ride commences. In some more advanced rides, some sort of electromechanical feedback may be employed to verify that the safety feature is properly engaged. Relying on a ride attendant has obvious drawbacks in terms of safety issues and therefore, an electromechanical safety feature may reduce human error in certain situations.

Surveillance systems and the like are widely used in various industries. In certain instances, one or more video cameras continually stream video to a video recorder. Typically, a video recorder may include a computer-based server which can record multiple simultaneous video streams to a memory, such as a hard disk or solid state memory. A buffer period of 8, 12, 24, or 48 hours, for example, may be use used. In many instances, no need will arise to review or store the recorded video so the buffer is overwritten. In other systems, a longer period of time may be utilized or the buffer is weeks or months of data being stored and saved for particular purposes. When an event occurs, the video is available for review, archiving, and analysis of the video data. On occasion, police, rescue personal, or other authorities may need to review the various camera systems in a particular area or arena for purposes necessary to their investigation.

There exists a need to develop an analytical technology that provides real time safety features to prevent consumer or user injury in case of human error.

SUMMARY

The following definitions are applicable throughout this disclosure:

A "video camera" may refer to an apparatus for visual recording. Examples of a video camera may include one or more of the following: a video imager and lens apparatus; a video camera; a digital video camera; a color camera; a monochrome camera; a camcorder; a PC camera; a webcam; an infrared (IR) video camera; a low-light video camera; a thermal video camera; a closed-circuit television (CCTV) camera; a pan/tilt/zoom (PTZ) camera; a hemispherical or fisheye camera, and a video sensing device. A video camera may be positioned to perform observation of an area of interest.

"Video" may refer to the motion pictures obtained from a video camera represented in analog and/or digital form. Examples of video may include: television; a movie; an image sequence from a video camera or other observer; an image sequence from a live feed; a computer-generated image sequence; an image sequence from a computer graphics engine; an image sequence from a storage device, such as a computer-readable medium, a digital video disk (DVD), or a high-definition disk (HDD); an image sequence from an IEEE 1394-based interface; an image sequence from a video digitizer; or an image sequence from a network.

"Video data" is a visual portion of the video.

"Non-video data" is non visual information extracted from the video data, and may include metadata associated with the video data.

A "video sequence" may refer to a selected portion of the video data and/or the non-video data.

"Video processing" may refer to any manipulation and/or analysis of video data, including, for example, compression, editing, and performing an algorithm that generates non-video data from the video.

A "frame" may refer to a particular image or other discrete unit within video.

A "computer" may refer to one or more apparatus and/or one or more systems that are capable of accepting a structured input, processing the structured input according to prescribed rules, and producing results of the processing as output. Examples of a computer may include: a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; a quantum computer; a biological computer; a nanotube computer; and any apparatus that may accept data, may process data in accordance with one or more stored software programs, may generate results, and typically may include input, output, storage, arithmetic, logic, and control units.

"Software" may refer to prescribed rules to operate a computer. Examples of software may include: code segments; instructions; applets; pre-compiled code; compiled code; interpreted code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that may store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

"Real time" analysis or analytics means processing real time or "live" video and providing near instantaneous reports or warnings of abnormal conditions (pre-programmed conditions), abnormal scenarios (loitering, convergence, separation of clothing articles or backpacks, briefcases, groceries for abnormal time, etc or other scenarios based on behavior of elements (customers, patrons, people in crowd, etc.) in one or multiple video streams.

"Post time" analysis or analytics means processing stored or saved or video from a camera source (from a particular camera system (store, parking lot, street) or other video data (cell phone, home movie, etc.)) and providing reports or warnings of abnormal conditions (post-programmed conditions), abnormal scenarios (loitering, convergence, separation of clothing articles or backpacks, briefcases, groceries for abnormal time, etc., and/or other scenarios based on behavior of elements (customers, patrons, people in crowd, etc.) in a stored one or more video streams.

"Video Tripwire" means the detection of objects moving in one or more specified direction(s) crossing over a line defined within the camera's view.

"Video TripBox" means the detection of objects entering into, and/or exiting from, a closed boundary such as a polygon defined within the camera's view.

In an aspect, the present disclosure is directed to an entertainment device safety system. The disclosed system includes a video camera configured to capture video of an entertainment device and a user of the entertainment device and a video analytic module to perform real-time video processing of the captured video to generate non-video data from the captured video. The disclosed system further includes a computer configured to receive the video and the non-video data from the video camera, wherein the computer is programmed to analyze one of the video and the non-video data to determine a user position in relation to the entertainment device, compare the user position to a user position rule, determine whether the user position violates the user position rule, and transmit a notification in response to a determination that the user position violates the user position rule.

In some embodiments, the computer is further programmed to perform the steps of analyzing one of the video and the non-video data to determine the entertainment device type and choosing the user position rule based at least in part upon the entertainment device type.

In some embodiments, the computer is further programmed to perform the steps of analyzing one of the video and the non-video data to determine a safety device position in relation to the entertainment device, comparing the safety device position to a safety device position rule, determining whether the safety device position violates the safety device position rule, and transmitting a notification in response to a determination that safety device position violates the safety device position rule.

In some embodiments, the computer is further programmed to perform the steps of analyzing the video or the non-video data to determine the entertainment device type and choosing the safety device position rule based at least in part upon the entertainment device type.

In some embodiments, the computer is further programmed to perform the step of choosing the safety device position rule based at least in part upon the entertainment device type.

In some embodiments, the safety device position rule is based at least in part upon a safety device color.

In some embodiments, the video camera is configured to capture infra-red images and the safety device includes an fluorescent infra-red pigment. In some embodiments, the system includes a source of infrared light.

In some embodiments, the user position rule includes at least one of an aspect ratio, an absolute height, an absolute width, and a weighted centroid.

In some embodiments, the computer is further configured to receive a position signal from the entertainment device.

In some embodiments, transmitting a notification includes causing the entertainment device to cease operation. In some embodiments, transmitting a notification includes activating a visual indicator adjacent to the user.

In another aspect, the present disclosure is directed to an entertainment device safety method. The disclosed method includes capturing video of an entertainment device and a user of the entertainment device and performing real-time video processing of the captured video to generate non-video data from the captured video. The disclosed method further includes analyzing one of the video and the non-video data to determine a user position in relation to the entertainment device, comparing the user position to a user position rule, determining whether the user position violates the user position rule, and transmitting a notification in response to a determination that the user position violates the user position rule.

In some embodiments, the video or the non-video data is analyzed to determine the entertainment device type and the user position rule is chosen based at least in part upon the entertainment device type.

In some embodiments, the video and the non-video data is analyzed to determine a safety device position in relation to the entertainment device, comparing the safety device position to a safety device position rule, determining whether the safety device position violates the safety device position rule, and transmitting a notification in response to a determination that safety device position violates the safety device position rule.

In some embodiments, the video and the non-video data is analyzed to determine the entertainment device type and the safety device position rule is chosen based at least in part upon the entertainment device type.

BRIEF DESCRIPTION OF THE DRAWING

FIG. 1 is a system block diagram of an embodiment of a video observation, surveillance and verification system in accordance with the present disclosure.

DETAILED DESCRIPTION

Particular embodiments of the present disclosure are described hereinbelow with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions.

Additionally, the present disclosure may be described herein in terms of functional block components, code listings, optional selections, page displays, and various processing steps. It should be appreciated that such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting language such as C, C++, C#, Java, COBOL, assembler, PERL, Python, PHP, or the like, with the various algorithms being implemented with any combination of data structures, objects, processes, routines or other programming elements. The object code created may be executed on a variety of operating systems including, without limitation, Windows®, Macintosh OSX®, iOS®, linux, and/or Android®.

Further, it should be noted that the present disclosure may employ any number of conventional techniques for data transmission, signaling, data processing, network control, and the like. It should be appreciated that the particular implementations shown and described herein are illustrative of the disclosure and its best mode and are not intended to otherwise limit the scope of the present disclosure in any way. Examples are presented herein which may include sample data items (e.g., names, dates, etc.) which are intended as examples and are not to be construed as limiting. Indeed, for the sake of brevity, conventional data networking, application development and other functional aspects of the systems (and components of the individual operating components of the systems) may not be described in detail herein. Furthermore, the connecting lines shown in the various figures contained herein are intended to represent example functional relationships and/or physical or virtual couplings between the various elements. It should be noted that many alternative or additional functional relationships or physical or virtual connections may be present in a practical electronic data communications system.

As will be appreciated by one of ordinary skill in the art, the present disclosure may be embodied as a method, a data processing system, a device for data processing, and/or a computer program product. Accordingly, the present disclosure may take the form of an entirely software embodiment, an entirely hardware embodiment, or an embodiment combining aspects of both software and hardware. Furthermore, the present disclosure may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices (e.g., USB thumb drives) and/or the like.

In the discussion contained herein, the terms "user interface element" and/or "button" are understood to be non-limiting, and include other user interface elements such as, without limitation, a hyperlink, clickable image, and the like.

The present disclosure is described below with reference to block diagrams and flowchart illustrations of methods, apparatus (e.g., systems), and computer program products according to various aspects of the disclosure. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, mobile device or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present disclosure may consist of any combination of databases or components at a single location or at multiple locations, wherein each database or system includes any of various suitable security features, such as firewalls, access codes, encryption, de-encryption, compression, decompression, and/or the like.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential."

It is important to note that the present disclosure goes beyond facial recognition software (which may be utilized in conjunction herewith) and provides additional algorithms and analytics for tracking purposes as explained below. In addition, it is not necessary in certain instances that facial recognition be utilized to flag or track someone or something and the presently described system may be employed without facial recognition software or algorithms which may prove insensitive to certain moral, federal or local laws.

The system may be able to combine pre-programmed analytics to alert for one or more (or a combination of) abnormal scenarios. For example, a person getting out of his/her seat after the ride has commenced, a harness or safety bar coming unlatched after the ride has commenced, a child standing after the ride has commenced, a child climbing into a parent's lap after the ride has commenced, etc.

The present disclosure relates to a video analytical safety system that analyzes, in real time, certain safety conditions and notifies the ride operators of a fault condition or automatically stops the ride depending on the severity of the condition. As such, a video camera equipped with video analytics is positioned at various locations along the ride and is configured or programmed to recognize various unsafe conditions. For example, at the beginning of the ride, a ride operator is typically provided with some sort of height aid that allows the ride operator to assess the height of a child or small adult prior to allowing the person access to the ride, e.g., a height bar. These height requirements are provided by the ride manufacturers as a safety concern for persons that fall below a certain height requirement. In some circumstances, small adults or small children manipulate themselves onto the ride due to confusion, lack of attention, or, in some cases, by bribing the ride attendant. As can be appreciated, this represents a safety concern for the amusement park.

The present disclosure may alleviate these concerns by monitoring the height bar with a video surveillance camera and analyzing each person's height as it relates to a particular ride. The level of sophistication of the analytics can range from simple to very advanced. For example, the video system may simply be equipped to provide a "go" (green) or "no go" (red) for each person stepping onto the ride. The level of sophistication of the analytics can include a second or a series of cameras that put a hold on the ride if that same person is allowed on the ride. In other words, the system may recognize but not necessarily identify the person either facially or by some other set or group of parameters which characterize that person for later analysis. In other words, in view of the sensitivities and legalities associated with facial recognition and identification, and although the system may have both of these capabilities, the system may simply be configured to recognize a particular person based on facial characteristics or any combination of other characteristics or individual features without correlating such features with an identification. Moreover, these video records of a particular person may be deleted on a daily basis to alleviate privacy concerns. In some embodiments, facial features of the individual may be obscured by, for example, overlaying a blur or mosaic effect to the individual's face.

Examples, of individualizing features which may be combined to individualize a person: height, eye color, hair color, facial hair, clothing parameters (shirt color/type, plus hat color/type/orientation, plus pant color/type), other clothing items, e.g., watch, belt, jewelry, tattoos, etc. Any combination of these parameters can make an individual video record that may be compared or tracked for additional analysis. For example, once the record is made and the person is identified, another analytical camera for that same ride may be programmed to identify the person and provide the ride operator with a default condition and not start the ride. In more detail, embodiments of a camera or video system in accordance with the present disclosure are programmed to identify whether a subject individual meets the height requirements for a given ride. This determination may be made at a point in the ride queue, at a height aid at the head of the queue, or at any suitable point prior to a subject gaining entrance to the ride. In the event the subject does not meet the height requirement, a visual profile of the individualizing features of the subject is stored, and flagged as ineligible for the ride. A second camera is positioned beyond the ride entrance, for example, trained upon individuals walking along an inner hallway, at a staging area, or at individuals as positioned in or on the ride. If the second camera detects, beyond the ride admission point, an individual who did not meet the height requirements, an exception condition is raised which may trigger any number of responses. For example, an operator or supervisor may be presented with a video feed showing the ineligible individual highlighted among the other persons in the frame, a visual indicator may be activated at the seat or position at which the ineligible individual is located to quickly draw attention to the situation, departure of the offending individual's ride may be prevented, a security record memorializing the facts of the event may be stored in a database, and so forth.

Moreover, the same video record may be sent to similar rides of the same height or greater to deny the person access to that ride. Once the video record is created, all the rides and the corresponding video surveillance network for each ride (or the entire park) may be notified of the video record which further eliminates human error or other more illicit human circumvention. In embodiments, this system can be made more consumer-friendly by providing a camera at the beginning the line or ride entry that flags the person as too small to go onto the ride (based on the video analytics of that ride or based on the network recognizing the person from being denied on another ride).

In some instances, it may prove advantageous for the amusement park to readily identify or identify in real time the consumer or user that is flagged by the video record and automatically provide a selection of alternate rides for that person based on size requirements. The rides may be arranged based on where the flagged person is located in the park. In addition or alternatively, a flagged user may be identified to the overall park video surveillance network and given a selection of alternate rides. Once selected, the user may be placed in a fast lane (e.g., Disney's FASTPASS™) for that particular ride as a courtesy since the user may have already waited on a line for some time and was flagged as ineligible for that ride.

The present disclosure may be utilized to alleviate other safety concerns which may be subject to human or mechanical error. For example, the video analytical system may be utilized as a secondary safety feature for all rides and tied into an emergency shut off for that ride. As can be appreciated, this type of system may also range very simple to sophisticated. For example, in the case of a malfunctioning safety bar (not engaged or raised at the commencement of the ride), the video analytical system may include a trip wire that automatically recognizes the raised bar and shuts the ride until the bar is lowered or fixed. More complicated systems may detect or recognize (as described above) an unauthorized rider based on height (or some other characteristic that may be manually entered, e.g., a rowdy rider that was manually flagged).

The system may be configured to recognize a real time event after commencement of the ride, e.g., a person standing up, a child being place on a lap or escaping his/her harness or safety bar, a person reaching outside the ride. Any of these conditions may be automatically detected and the ride stopped (or slowed) to address these issues. Video analytics may be utilized for this purpose and may include video trip wires, or video trip boxes. The video analytics may be configured to detect features in a series of successive frames and/or may be configured to detect features in a single captured frame. For example, a video camera may be configured to capture a section of roller coaster track, from a point of view facing the front of the cars, above the track, such that a clear view of each passenger position of each car is obtained. When a car passes into the frame, an analysis of the video is triggered. The determination that a car has entered the frame may be accomplished by image recognition (e.g., by an algorithmic comparison between a frame of an empty track and a frame showing a car), by a sensor on the track, via a signal received from a ride controller, and/or combinations thereof. The system may be configured to trigger the detection of each car at the same location of the track as it travels within view of the camera. A video trip box defining a main zone around each available seat of the ride car is established. In addition, one or more sub-zones may be established defining the boundaries of the car, the position of a restraint device, a minimum rider size, and so forth. Each trip box or zone is analyzed to determine whether a rider is present in that seat. If so, each sub-zone is analyzed to determine whether an exception condition exists which demands attention or a response. For instance, if no restraint device is detected in the restraint sub-zone, an unsecured rider exception is raised. If a portion of an individual is detected both within a main zone and outside of the car boundary zone, an unsafe rider exception is raised.

In another embodiment, an aspect ratio analysis or zone morphology analysis is performed on each detected rider. The shape of each detected rider is compared to one or more predetermined characteristics to ascertain whether the rider is improperly positioned, e.g., standing, sitting on another's lap, kneeling, legs crossed over the legs of another, slouched under a restraint bar, etc. An aspect ratio of a bounding box established around a rider is determined. Additionally or alternatively, an absolute height and width of a rider may be established, and/or a weighted centroid of a rider may be determined. The measured aspect ratio, absolute height, absolute width, and weighted centroid values are compared with predetermined ranges of aspect ratio, absolute height, absolute width, and weighted centroid to determine whether the rider falls within acceptable limits. In some embodiments, a simple rules-based algorithm may be used in order to enhance processing efficiency. In other embodiments, a lookup table, or a formula may be utilized. In some embodiments, parameters from two or more frames of video may be averaged to reduce false positives and increase system confidence and accuracy.

In still another embodiment, a chromatic analysis may be performed on each rider to detect and compare colors associated with known visual elements of a ride and its surroundings (color of seats, color of restraint devices, walkways, walls, etc.) and with the rider and/or the rider's clothing. For example, color schemes associated with ride equipment (red pin in black seat buckle, bottom of safety bar may include bright color, alternating yellow/black stripes, etc.) may be detected or appear in view when properly engaged or configured. If the expected colors are not detected at the expected location, an unsecured rider exception is flagged. The system may include analytics that recognize two people in a single seat by facial recognition, counting appendages, recognizing two different garments, etc.

In yet another embodiment, markers or coatings invisible to the human eye may be incorporated into ride elements to facilitate recognition of riders and rider posture, and to improve contrast between ride elements (e.g., background elements in a scene) and riders. For example, fluorescent infrared paint (e.g., coatings which are highly reflective to IR light) may be used on some or all of a ride, or on certain ride elements. Use of an IR light source in conjunction with a digital video analytics camera of the present disclosure may increase system confidence, response time, and enable the aesthetic design of the ride to be unencumbered by human-perceivable markings which may detract from the theme park experience.

In some embodiments, one or more human-readable and/or barcode labels that uniquely identify the ride car, and/or individual seat positions may be utilized. The label and/or barcode may be of sufficient size to be readily resolvable by the analytics camera. When the frame(s) are analyzed, information encoded in the label and/or barcode is decoded and associated with the rider(s) and/or the ride car(s) present in the frame, e.g., as metadata. In this manner, as events are detected, the relevant ride cars and seat positions related to the events may be used to facilitate rapid and positive identification of the ride car and/or persons of interest. In embodiments, the ride car and/or seat identification may be communicated to a ride control system, which may in response bring the ride to a halt, slow the ride, activate a spotting lamp above a flagged rider's head, present a message to the rider instructing him or her to latch the restraint device, sit down, place hands in the car, etc. Additionally or alternatively, ride car and/or seat identification may be communicated to a security system, which, in turn, may log the event, store a recorded video clip of the event. Additionally or alternatively, ride car and/or seat identification and/or associated video or still images may be communicated to amusement park personnel via display device and/or a mobile device, such as a smartphone or pager, to enable the appropriate personnel to quickly and effectively respond to security and safety issues identified by the disclosed system.

The video analytics may also detect if a person is not correctly positioned inside the ride or slipping out of the safety bar during the ride by any one of the above discussed techniques. In this instance the video analytics can send an error message to the ride controller to safely stop the ride or trigger an automatic slow down and stop procedure based on where the car is along the ride (e.g., with respect to roller coaster).

For certain rides that have restrictions as to where smaller children (or adults) of a certain size may sit, the system may be configured to recognize these individuals based on seated height and alert the operator or suspend the ride until the person is repositioned in another seat in the ride. For example, a small child may be allowed on the ride with an adult but is not permitted to sit in the front car (or the front of the car) or to one particular side (inside versus outside). During busy ride times this can be a real safety concern if operators do not catch each instance that this occurs. Once alerted, the ride operator can easily make these adjustments without unduly delaying the ride.

The video analytics may also be utilized to regulate or control the gap between ride cars, which can be a real safety concern, particularly with busy or crowded rides. By analyzing real time images and making automatic or manual adjustments (e.g., the track may be equipped with dampeners or various slow down mechanisms to allow automatic or manual control of the gap between cars), the pace and speed of a ride may be adjusted to safely accommodate varying crowd conditions. In these embodiments, analytics data may be communicated to a ride control system and/or to manual operators to adjust ride speed, frequency of departure, and the like. The analytics may also be utilized to automatically detect whether a passenger has fallen out of a ride or gotten out on his/her own accord (behavior which is not uncommon on frightening rides). It is not uncommon for a rider of a frightening ride (or possibly any ride) to attempt to exit the ride car after the ride has commenced. Small children may particularly pose a safety concern in this area. The analytics and system may be designed to include a trip box feature that is designed to surround the ride car and alert the ride operator of an unsafe condition or perform an automatic slow down and stop should a person exit the ride prematurely.

In a typical ride all of the cameras associated with that ride may be configured to include one or more of the above noted analytical tools or the video data from a camera, array of cameras or camera system may be analyzed by a server.

With any of the aforedescribed scenarios or alerts noted herein, the software may work in conjunction with a video library of images or algorithms to trigger alerts or respond to queries. Additional images, such library images and/or user generated images, may be provided as inputs to the software and used to analyze video through the recognition software. This may all happen in real time or during post time analysis. Again queries may be entered depending upon a particular purpose and the system can in real time or post time analyze video for the queried conditions.

In some instances, ride manufacturers might benefit from any of the above discussed video analytics to provide future better designed or safer rides.

With reference to FIG. 1, a video observation, surveillance and verification system according to an embodiment of this disclosure is shown as 100. System 100 is a network video recorder that includes the ability to record video from one or more cameras 110 (e.g. analog and/or IP camera). System 110 includes one or more video cameras 110 that connect to a computer 120 across a connection 130. Connection 130 may be an analog connection that provides video to the computer 120, a digital connection that provides a network connection between the video camera 110 and the computer 120, or the connection 130 may include an analog connection and a digital connection.

System 100 may include one or more video cameras 110 wherein each video camera 110 connects to the computer 100 and a user interface 122 to provide a user connection to the computer 120. The one or more video cameras 110 may each connect via individual connections, may connect through a common network connection, or through any combination thereof.

System 100 includes at least one video analytics module 140. A video analytics module 140 may reside in the computer 120 and/or one or more of the video cameras 110. Video analytics module 140 performs video processing of the video. In particular, video analytics module 140 performs one or more algorithms to generate non-video data from video. Non-video data includes non-video frame data that describes content of individual frames such as, for example, objects identified in a frame, one or more properties of objects identified in a frame and one or more properties related to a pre-defined portions of a frame. Non-video data may also include non-video temporal data that describes temporal content between two or more frames. Non-video temporal data may be generated from video and/or the non-video frame data. Non-video temporal data includes temporal data such as temporal properties of an object identified in two or more frame and a temporal property of one or more pre-defined portions of two or more frames. Non-video frame data may include a count of objects identified (e.g., objects may include people and/or any portion thereof, inanimate objects, animals, vehicles or a user defined and/or developed object) and one or more object properties (e.g., position of an object, position of any portion of an object, dimensional properties of an object, dimensional properties of portions and/or identified features of an object) and relationship properties (e.g., a first object position with respect to a second object), or any other object that may be identified in a frame. Objects may be identified as objects that appear in video or objects that have been removed from video.

Video analytics module 140 positioned in a camera 110 converts video to video data and non-video data from the camera 110 and provides the video data and the non-video data to the computer 120 over a network. As such, the system 100 distributes the video processing to the edge of the network thereby minimizing the amount of processing required to be performed by the computer 120.

Computer 120 includes computer-readable medium including software for monitoring user behavior, which software, when executed by a computer 120, causes the computer 120 to perform operations. User interface 122 provides an interface to the computer 120. User interface 122 may connect directly to the computer 120 or connect indirectly to the computer 120 through a user network.

A user behavior is defined by an action, an inaction, a movement, a plurality of event occurrences, a temporal event, an externally generated event or any combination thereof. A particular user behavior is defined and provided to the computer 120.

An action may include moving a safety bar, repositioning a safety bar, moving a hand, arm, leg, foot and/or body out of a designated area. Other examples are discussed above.

Inaction may include a ride operator failing to engage a safety mechanism or failing to reposition a small child from an unauthorized seat. Inaction may also include failing to walk to a particular designated safe area for a ride operator or failure to perform a particular task. An example of an inaction is a ride operator not being stationed at an assigned area, e.g., height control area or in an area designated for viewing safety features, e.g., that pins are engaged or bars are secured.

As various changes could be made in the above constructions without departing from the scope of the disclosure, it is intended that all matter contained in the above description shall be interpreted as illustrative and not in a limiting sense. It will be seen that several objects of the disclosure are achieved and other advantageous results attained, as defined by the scope of the following claims.

What is claimed is:

1. An entertainment device safety system, comprising:
a video camera configured to capture video of an entertainment device and a user of the entertainment device;
one or more processors; and
one or more memories storing instructions that, when executed by the one or more processors, cause the one or more processors to:
perform real-time video processing of the captured video to generate non-video data from the captured video,
receive the video and the non-video data from the video camera,
analyze the video or the non-video data to determine a user position in relation to the entertainment device and to determine a type of the entertainment device,
wherein the one or more memories further store a plurality of rules associated with a plurality of types of entertainment devices, respectively, and the user position rule is one of the plurality of rules,
choose a user position rule based on the type of entertainment device,
compare the user position to the user position rule,
determine whether the user position violates the user position rule, and
transmit a notification in response to a determination that the user position violates the user position rule.

2. The entertainment device safety system of claim 1, wherein the one or more memories further store instructions that, when executed by the one or more processors, cause the one or more processors to:
analyze the video or the non-video data to determine a safety device position of a safety device in relation to the entertainment device;
compare the safety device position to a safety device position rule;
determine whether the safety device position violates the safety device position rule; and
transmit a notification in response to a determination that the safety device position violates the safety device position rule.

3. The entertainment device safety system of claim 2, wherein the one or more memories further store instructions that, when executed by the one or more processors, cause the one or more processors to:
analyze the video or the non-video data to determine a type of entertainment device; and
choose the safety device position rule based on the type of entertainment device.

4. The entertainment device safety system of claim 3, wherein the safety device position rule is chosen based on a color of the safety device.

5. The entertainment device safety system of claim 4, wherein the safety device includes a fluorescent infra-red pigment.

6. The entertainment device safety system of claim 5, wherein the video camera is configured to capture infra-red images of the safety device.

7. The entertainment device safety system of claim 1, wherein the user position rule includes at least one of an aspect ratio, an absolute height, absolute width, or a weighted centroid.

8. The entertainment device safety system of claim 1, wherein the one or more memories further store instructions that, when executed by the one or more processors, cause the one or more processors to receive a position from the entertainment device.

9. The entertainment device safety system of claim 2, wherein the one or more memories further store instructions that, when executed by the one or more processors, cause the one or more processors to cease operation of the entertainment device if it is determined that the safety device position violates the safety device position rule.

10. The entertainment device safety system of claim 2, wherein the one or more memories further store instructions that, when executed by the one or more processors, cause the one or more processors to activate a visual indicator if it is determined that the safety device position violates the safety device position rule.

11. An entertainment device safety method, comprising:
capturing video of an entertainment device and a user of the entertainment device;
performing real-time video processing of the captured video to generate non-video data from the captured video;
analyzing the video or the non-video data to determine a user position in relation to the entertainment device and to determine a type of the entertainment device;
storing a plurality of rules associated with a plurality of types of entertainment devices, respectively, wherein the user position rule is one of the plurality of rules;
choosing a user position rule based on the type of entertainment device;
comparing the user position to the user position rule;
determining whether the user position violates the user position rule; and
transmitting a notification in response to a determination that the user position violates the user position rule.

12. The entertainment device safety method of claim 11, further comprising:
analyzing the video or the non-video data to determine a safety device position of a safety device in relation to the entertainment device;
comparing the safety device position to a safety device position rule;
determining whether the safety device position violates the safety device position rule; and
transmitting a notification in response to a determination that the safety device position violates the safety device position rule.

13. The entertainment device safety method of claim 12, further comprising:
analyzing the video or the non-video data to determine a type of entertainment device; and
choosing the safety device position rule based on the type of entertainment device.

* * * * *